United States Patent
Kurkinen et al.

(10) Patent No.: US 9,033,077 B2
(45) Date of Patent: May 19, 2015

(54) UTILITY VEHICLE DRIVE SYSTEM

(71) Applicant: Valtra Oy Ab, Suolahti (FI)

(72) Inventors: Kimmo Kurkinen, Suolahti (FI); Petri Hannukainen, Suolahti (FI)

(73) Assignee: Valtra Oy Ab, Soulahti (FI)

( * ) Notice: Subject to any disclaimer, the term of this patent is extended or adjusted under 35 U.S.C. 154(b) by 79 days.

(21) Appl. No.: 13/726,377

(22) Filed: Dec. 24, 2012

(65) Prior Publication Data

US 2013/0164148 A1  Jun. 27, 2013

(30) Foreign Application Priority Data

Dec. 23, 2011  (GB) .................................. 1122219.7

(51) Int. Cl.
| | |
|---|---|
| *F04B 17/05* | (2006.01) |
| *B60K 6/48* | (2007.10) |
| *B60K 17/10* | (2006.01) |
| *B60T 13/12* | (2006.01) |
| *B60K 25/00* | (2006.01) |
| *B62D 49/00* | (2006.01) |

(52) U.S. Cl.
CPC ................. *F04B 17/05* (2013.01); *B60T 13/12* (2013.01); *B60K 25/00* (2013.01); *B62D 49/00* (2013.01); *B60K 6/48* (2013.01); *B60K 17/10* (2013.01); *B60Y 2200/221* (2013.01); *Y02T 10/6221* (2013.01)

(58) Field of Classification Search
None
See application file for complete search history.

(56) References Cited

U.S. PATENT DOCUMENTS

| | | | |
|---|---|---|---|
| 2008/0020875 A1* | 1/2008 | Serrels et al. ................. | 474/70 |
| 2009/0018716 A1* | 1/2009 | Ambrosio ...................... | 701/22 |
| 2011/0231046 A1* | 9/2011 | Bissontz ........................ | 701/22 |

FOREIGN PATENT DOCUMENTS

| | | |
|---|---|---|
| DE | 3218664 A1 | 11/1983 |
| DE | 19727058 A1 | 2/1998 |
| GB | 2136750 A | 9/1984 |

OTHER PUBLICATIONS

GB Search Report for GB Application No. 1122219.7 Dated Apr. 23, 2012.

* cited by examiner

*Primary Examiner* — J. Allen Shriver, II
*Assistant Examiner* — Hilary L Johns

(57) ABSTRACT

A hybrid drive system for a utility vehicle (1) which operates with an internal combustion engine (12) and an electrical generator (80), motor (86) and storage means (84). Auxiliary hydraulic functions (93,94) may be powered by the electric motor (86). An output of the engine (12) is mechanically coupled to a multi-ratio transmission (10) which has a hydrostatic driveline (24) and an output which is mechanically coupled to propulsion means. With the engine switched off, the electric motor powers a hydraulic pump (91) which generates pressurized fluid to operate auxiliary functions. In addition, the pressurized fluid may be exploited in a secondary propulsion mode to drive a hydraulic motor (92) in the hydrostatic transmission to propel the vehicle in a low emission, low noise output mode.

11 Claims, 2 Drawing Sheets

UTILITY VEHICLE DRIVE SYSTEM

CROSS-REFERENCE TO RELATED APPLICATION

The present application claims the benefit of and priority from United Kingdom Application No. 1122219.7, filed Dec. 23, 2011, the entire disclosure of which is hereby incorporated by reference.

FIELD OF INVENTION

The invention relates to drive systems for utility vehicles such as agricultural tractors and plant machinery which include an internal combustion engine, an electrical generator and storage means, and at least one electrically driven hydraulic pump.

BACKGROUND

Today utility vehicles are powered by internal combustion engines. There is a continuing drive to reduce the emissions of such vehicles for environmental reasons. One way to reduce emissions in automobiles is to automatically switch off the engine when stationary, when in traffic for example. However, this method of operation has not been introduced in utility vehicles because repetitive stopping and starting of the engine would lead to excessive delay for the operator. For instance, the multitude of hydraulic functions need to reach working pressure before the vehicle can be operated. Each time the engine is stopped, the pressures of the accumulators, etc, in the hydraulic systems drop below working pressure. This results in long periods of idling whilst the vehicle is stationary.

Another drawback of internal combustion engines is the output noise levels. This is especially the case for agricultural tractors. In addition to the problems associated with operator comfort, noisy tractors can cause distress to cattle and other animals when operating nearby. This is quite common when supplying feed to cattle in sheds in winter months.

SUMMARY OF INVENTION

It is an object of the invention to provide an improved drive system for a utility vehicle which at least partially alleviates the aforementioned problems.

It is another object of the invention to provide a drive system for a utility vehicle which operates with less engine idling.

It is yet another object of the invention to provide a more environmentally friendly method of operating a utility vehicle.

In accordance with a first aspect of the invention there is provided a utility vehicle comprising an internal combustion engine having an output mechanically coupled to a multi-ratio transmission which has a hydrostatic driveline and an output which is mechanically coupled to propulsion means, an electric generator driven by the engine output, electric storage means, and a hydraulic pump driven by an electric motor which derives power from the electric generator or the storage means, wherein the hydrostatic driveline includes a propulsive hydraulic motor in hydraulic communication with said hydraulic pump via a hydraulic connection which can be selectively activated in a secondary propulsion mode so as to propel the vehicle when the engine is inactive.

The invention allows the hydraulic motor in a hydrostatic branch of a power-split transmission to be driven by a source of pressurised fluid from the electrically-powered hydraulic pump. Advantageously, this allows the vehicle to be moved for a short period of time with low noise and low emission output. This is particularly advantageous when applied to an agricultural tractor for cattle shed operation.

By driving the hydraulic pump with an electric motor, various functions of the vehicle may also be operable whilst the engine is switched off. Therefore, low emission and noise output can be achieved. For example, the operator may drive into a cattle shed with a bale of feed on a front loader. Once in the shed the engine may be switched off whilst the operator (or someone else) unwraps the bale. The front loader can then be operated to tip the bale without starting the engine.

The vehicle may comprise one or more hydraulic pumps used for non-propulsive functions which may include, by way of example only, braking systems, linkage control systems and transmission ratio change systems. Each of these systems require a source of pressurised fluid to operate. In conventional utility vehicles, the operator is often required to wait after starting the engine for the auxiliary hydraulic systems to build up to working pressure. By driving the pumps with electric motors, a standby mode can be provided in which pressurised fluid is available to auxiliary functions when the engine is switched off. This avoids any waiting before moving the vehicle following starting of the engine.

The term 'non-propulsive' should be understood to mean 'of or relating to a function which is not directly causing propulsion of the vehicle'. A hydraulic motor in a hydrostatic branch of a multi-ratio transmission is excluded by the term non-propulsive.

In a preferred arrangement the vehicle further comprises a clutch between the engine output and the generator, and when in a tertiary propulsion mode, the clutch is disengaged, the engine is inactive, and the generator is operable as a motor to power the transmission and the propulsion means. In this case, the generator can operate as a motor when the engine is switched off so as to provide a low emission, low noise propulsion mode for a limited period of time.

In accordance with a second aspect of the invention there is provided an agricultural tractor comprising an internal combustion engine having an output mechanically coupled to a multi-ratio transmission having an output which is mechanically coupled to propulsion means, an electric generator driven by the engine output, electric storage means, and a hydraulic pump arranged to provide pressurised fluid to a non-propulsive hydraulic consumer, the hydraulic pump being driven by an electric motor which derives power from the electric generator or storage means, wherein the hydraulic pump is operable when the engine is inactive.

In accordance with a third aspect of the invention there is provided a method of operating a utility vehicle comprising an internal combustion engine having an output mechanically coupled to a transmission having a hydrostatic driveline and an output which is mechanically coupled to propulsion means, an electrical generator driven by an output of the engine, electrical storage means, and a hydraulic pump driven by an electrical motor which derives power from the electrical generator or storage means, the hydrostatic driveline includes a propulsive hydraulic motor in hydraulic communication with said hydraulic pump via a hydraulic connection, the method comprising receiving a command to initiate a secondary propulsion mode, switching off the engine, and diverting pressurised fluid from the hydraulic pump to the propulsive hydraulic motor so as to propel the vehicle when the engine is inactive

BRIEF DESCRIPTION OF DRAWINGS

Further advantages of the invention will become apparent from reading the following description of a specific embodiment with reference to the appended drawings in which.

DESCRIPTION OF EXAMPLE EMBODIMENT

Figure 1:
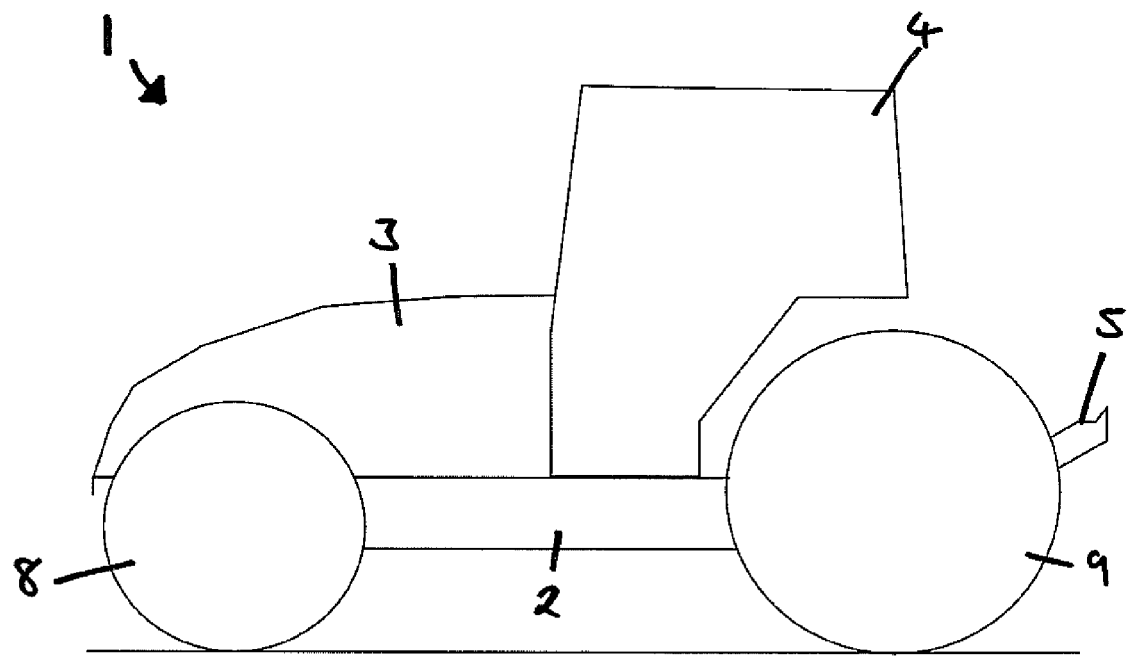
FIG. 1 is a side view of an agricultural tractor.
Figure 2:
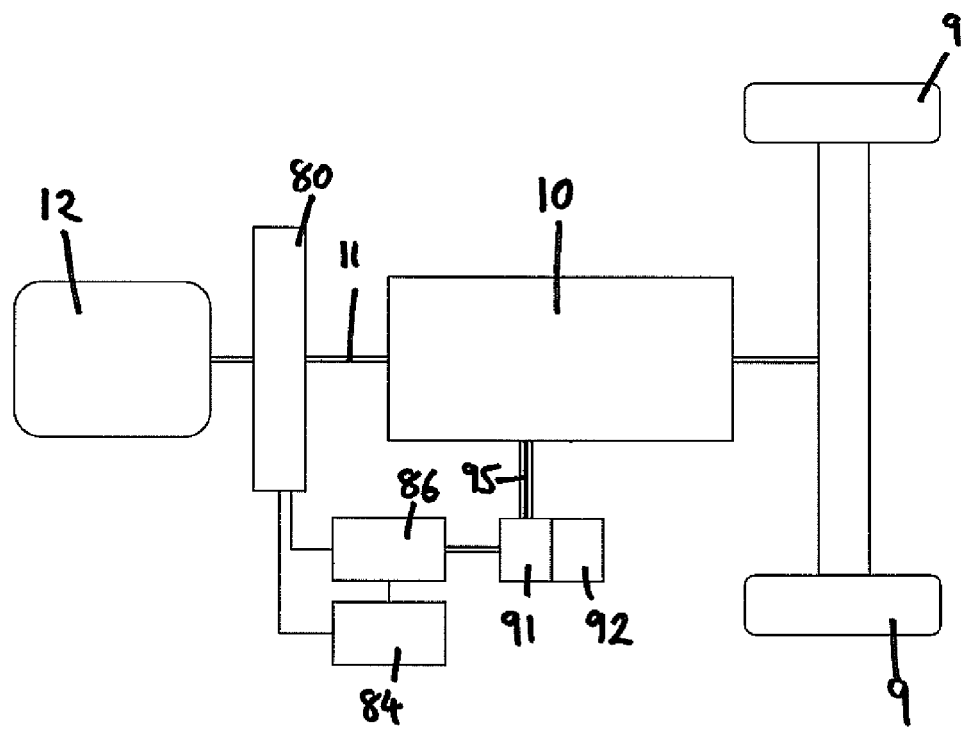
FIG. 2 is a plan diagrammatic view of a drive system on an agricultural tractor in accordance with an embodiment of the invention; and, FIG. 3 is a schematic view of the drive system of FIG. 2 shown in more detail.

With reference to FIG. 1, an agricultural tractor 1 comprises a frame 2, a hood 3, a cab 4, rear linkage 5, front wheels 8 and rear wheels 9. FIG. 2 shows a drive system 10 which includes an engine 12 under the hood 3.

Figure 3:
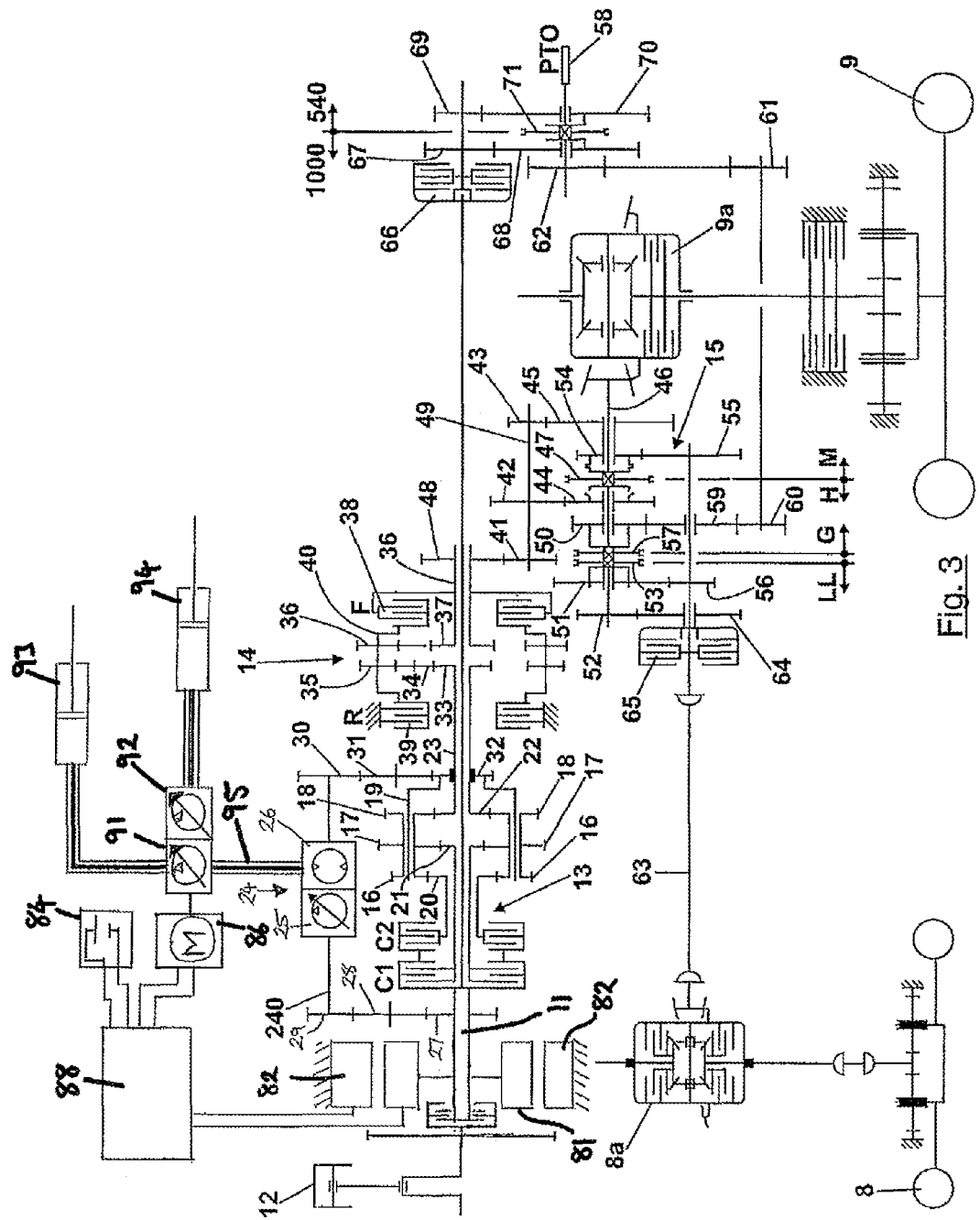

Referring to FIG. 3, a power-branched transmission 10 of a tractor has an input shaft 11 driven from an engine 12. The input shaft drives an epicyclic gear 13, a forward/reverse shuttle stage 14 and a further selectively engageable gear train 15 all in series. Gear train 15 in turn drives the front and rear wheels 8 and 9 via differentials 8a and 9a respectively.

The epicyclic gear 13 has three compound planets gears 16, 17, and 18 which rotate in unison at all times and are supported from a common carrier 19. Planets 16 and 17 engage sun gears 20 and 21 respectively which can be coupled with input shaft 11 via clutches C2 and C1 respectively. The third planet gear 18 engages a sun gear 22 mounted on an output shaft 23 of the epicyclic gear which is connected with the shuttle stage 14.

A hydraulic pump/motor loop 24, which includes a variable displacement pump 25 connected with a motor 26, drives the planet carrier 19 from the input shaft 11 via gears 27, 28, 29, 30, 31, 32. The pump 25 is mounted on a shaft 240 which is driven by gear 29 mounted thereto.

The epicyclic gear 13 is designed to provide a continuous variation of ratio from a geared neutral condition in which the output shaft 23 is not rotating up to a ratio of say 2.2:1 or 2.6:1 as follows.

Initially clutch C1 is engaged which drives sun 21 from the input shaft 11 and the carrier is driven by the pump/motor loop 24 at speeds varying from the maximum negative speed of rotation of the carrier (i.e. with the carrier rotating at its maximum speed in the opposite direction to the direction of rotation of the engine), when the geared neutral condition exists, up to the maximum positive speed of the carrier (i.e. with the carrier rotating at its maximum speed in the same direction as the engine). This provides a ratio range of 0 to 1.

The clutch C2 is then engaged which drives sun 20 from the input shaft 11 and carrier 19 is driven by the pump/motor loop 24 from the maximum positive speed of rotation of the carrier to the maximum negative speed of rotation of the carrier. This provides the ratio range of 1 to 2.2.

The epicyclic forward/reverse shuttle 14 has a sun gear 33 on shaft 23 and a sun gear 37 on the output shaft 36. Planet gears 35 and 36 are mounted on a carrier 40 and a reverse idler 34 connects gears 33 and 35. Gears 36 and 27 also mesh without the use of an idler. Forward drive is engaged by engaging clutch 38 which locks the carrier 40 to the shaft 36. Reverse is engaged by engaging clutch 39 which locks the carrier 40 to the transmission housing.

Shaft 36 drives the further gear train 15 which is configured to give the required overall ratio range of the tractor. In the arrangement shown gears 41, 42, and 43 rotate with a shaft 49. Gear 41 meshes with gear 48 on shaft 36 to drive shaft 49 and gears 42 and 43 mesh with gears 44 and 45 and can be coupled to a differential pinion shaft 46 by a sliding coupler 47 (see arrow H) to provide a high gear train to shaft 46 via gears 42 and 44, which is used principally for road work and a low gear train (see arrow M) via gears 43 and 45 which provides maximum tractive force and is used principally for field work.

Gears 50 and 51 also surround shaft 46. Gear 51 can be coupled to shaft 46 (see arrow LL) using sliding coupler 53 to engage an even lower gear train via gears 43, 45, 54, 55, 56, and 51. If sliding coupler 57 is used to couple gear 50 to shaft 46 (see arrow G) the PTO shaft 58 is driven via gear train 50, 59, 60, 61 and 62 at a speed proportional to the ground speed of the tractor.

Gear 52 on shaft 46 drives the front wheel drive shaft 63 via gear 64 and front wheel drive clutch 65.

PTO shaft 58 can be driven from the input shaft 11 via a hydraulic clutch 66 and either gear train 67, 68 or 69, 70 using sliding coupler 71. Gear train 67, 68 gives a PTO shaft speed of 1000 RPM at a specified engine speed whereas gear train 69, 70 gives a PTO shaft speed of 540 RPM at the specified speed.

Turning back to FIG. 2, the driveline includes a flywheel generator 80 between the engine output and the transmission 10. The generator 80 comprises a rotor 81 fixed to transmission input shaft 11 and a stator 82 fixed relative to the vehicle frame and radially spaced from the rotor 81. Whilst the engine 12 is running, rotor 81 moves with respect to stator 82 and generates electric energy which is either stored by battery or super capacitor package 84 or utilised by electric motor 86. The electric energy is directed accordingly by power controller 88.

Although shown disposed between the engine 12 and the transmission 10, the generator 80 may instead be driven by an alternative drive shaft disposed downstream of the transmission for example. Furthermore, the generator 80 may replace the starter motor required on conventional utility vehicles.

The electric motor 86 is mechanically coupled to first and second auxiliary hydraulic pumps 91, 92 which each have a hydraulic output arranged to supply pressurised fluid to respective hydraulic consumers, represented in FIG. 3 as hydraulic cylinders 93, 94. It will be appreciated that hydraulic cylinders 93, 94 may be replaced by other hydraulic consumers such as hydraulic motors. Furthermore, the hydraulic cylinders 93, 94 merely represent examples of auxiliary outputs which may be associated with a brake system, a linkage control system or a ratio-change system by way of example. In the latter case, the cylinders are operable to control clutches C1, C2, F and R for example.

A hydraulic connection 95 exists between the first auxiliary hydraulic pump 91 and the hydraulic motor 26 disposed in the hydrostatic pump/motor loop 24. The connection 95 allows the selective delivery of pressurised fluid to the motor 26 in a secondary propulsion mode to be described in more detail below.

Turning back to the output of engine 12, a clutch C3 is disposed in the driveline between the engine 12 and generator 80. This clutch C3 is utilised in a secondary propulsion mode to be described in more detail below. Otherwise, in normal operation, clutch C3 is closed.

Operation

Standby Mode

When operating in a cattle shed for example where low emission and low noise levels are desirable, the engine 12 can be switched off, either automatically or manually. Whilst the engine is inactive, a standby mode can be initiated by operating the first auxiliary hydraulic pump (driven by the electric motor and stored electric energy) and thus maintaining a supply of pressurised fluid to the auxiliary systems.

The standby mode offers several benefits. Firstly, auxiliary hydraulic systems may operate whilst the engine 12 is inactive. For example, the operator may make use of linkage controls or front loader controls. Secondly, the tractor may become fully functional immediately after engine re-start without the need to wait for the auxiliary hydraulic pressure to build to working pressure.

Secondary Propulsion Mode

The tractor may be moved without the engine running by means of two alternative options. In a secondary propulsion mode, pressurised fluid generated by first auxiliary pump 91 is diverted to transmission pump 26 via hydraulic connection 95 to propel the vehicle without the engine 12 running. Clutches C1 and C2 may be closed simultaneously to lock part of the epicyclic gearing thus directing the torque generated to the output driveline. Advantageously, this mode of operation propels the vehicle by driving only part of the transmission thus with greater efficiency.

Tertiary Propulsion Mode

In a tertiary propulsion mode, stored electrical energy is utilised to power the generator 80 as a motor. In this mode of operation clutch C3 is opened to allow the transmission input shaft 11 to rotate independently of the inactive engine 12.

The generator 80 (operating as a motor) thus drives the entire transmission 10 as if powered by the engine 12. This allows the operator to move the vehicle with low emission and noise output for a period determined by the load and the energy stored by the battery 84.

It should be understood that the two alternative secondary propulsion modes are mutually exclusive in operation but may both be available in a single drive system.

Although described in relation to an agricultural tractor, it is envisaged that the invention can be implemented on other utility vehicles such as plant machinery and industrial tractors.

Only one electric motor 86 has been described thus far. However, it is envisaged that the vehicle 1 may include several electric motors associated with other auxiliary functions such as HVAC compressors for example. Of course, these may operate independently of the engine activity and may utilise electrical energy stored on battery 84.

In addition to charging by the generator 80, battery 84 may store electrical energy recovered upon braking using energy recovery systems known in the art.

In summary, there is provided a hybrid drive system for a utility vehicle which operates with an internal combustion engine and an electrical generator, motor and storage means. Auxiliary hydraulic functions may be powered by the electric motor. An output of the engine is mechanically coupled to a multi-ratio transmission which has a hydrostatic driveline and an output which is mechanically coupled to propulsion means. With the engine switched off, the electric motor powers a hydraulic pump which generates pressurised fluid to operate auxiliary functions. In addition, the pressurised fluid may be exploited in a secondary propulsion mode to drive a hydraulic motor (92) in a hydrostatic transmission to propel the vehicle in a low emission, low noise output mode.

From reading the present disclosure, other modification will be apparent to persons skilled in the art. Such modifications may involve other features which are already known in the field of utility vehicle drive systems and component parts therefore and which may be used instead of or in addition to features already described herein.

The invention claimed is:

1. A utility vehicle comprising:
an internal combustion engine having an output mechanically coupled to a multi-ratio transmission which has a hydrostatic driveline and an output which is mechanically coupled to propulsion means;
an electric generator driven by the engine output;
electric storage means; and,
a hydraulic pump driven by an electric motor which derives power from the electric generator or the storage means;
wherein the hydrostatic driveline includes a propulsive hydraulic motor in hydraulic communication with said hydraulic pump via a hydraulic connection which can be selectively activated in a secondary propulsion mode so as to propel the vehicle when the engine is inactive.

2. A utility vehicle according to claim 1 wherein the hydraulic pump is arranged to provide pressurised fluid to a non-propulsive hydraulic consumer.

3. A utility vehicle according to claim 1, further comprising a clutch between the engine output and the generator, and when in a tertiary propulsion mode, the clutch is disengaged, the engine is inactive, and the generator is operable as a motor to power the transmission and the propulsion means.

4. A utility vehicle according to claim 1, wherein said non-propulsive hydraulic consumer is a hydraulic cylinder arranged to control lifting of linkage arms for connection to an implement.

5. A utility vehicle according to claim 1, wherein said non-propulsive hydraulic consumer forms part of a braking system.

6. A utility vehicle according to claim 1, wherein said non-propulsive hydraulic consumer forms part of a transmission ratio-change system.

7. An agricultural tractor comprising an internal combustion engine having an output mechanically coupled to a multi-ratio transmission having an output which is mechanically coupled to propulsion means, an electric generator driven by the engine output, electric storage means, and a hydraulic pump arranged to provide pressurised fluid to a non-propulsive hydraulic consumer, the hydraulic pump being driven by an electric motor which derives power from the electric generator or storage means, wherein the hydraulic pump is operable when the engine is inactive, wherein the transmission comprises a hydrostatic driveline which includes a propulsive hydraulic motor, and wherein the hydraulic pump is in hydraulic communication with said propulsive hydraulic motor via a hydraulic connection which can be selectively activated in a secondary propulsion mode so as to propel the vehicle when the engine is inactive.

8. An agricultural tractor according to claim 7, further comprising a clutch between the engine output and the generator, and when in a tertiary propulsion mode, the clutch is disengaged, the engine is inactive, and the generator is operable as a motor to power the transmission and the propulsion means.

9. An agricultural tractor according to claim 7, wherein said non-propulsive hydraulic consumer is a hydraulic cylinder arranged to control lifting of linkage arms for connection to an implement.

10. An agricultural tractor according to claim 7, wherein said non-propulsive hydraulic consumer forms part of a braking system.

11. An agricultural tractor according to claim 7, wherein said non-propulsive hydraulic consumer forms part of a transmission ratio-change system.

* * * * *